United States Patent
Harmer

(10) Patent No.: US 8,826,023 B1
(45) Date of Patent: Sep. 2, 2014

(54) SYSTEM AND METHOD FOR SECURING ACCESS TO HASH-BASED STORAGE SYSTEMS

(75) Inventor: Craig K. Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1633 days.

(21) Appl. No.: 11/478,902

(22) Filed: Jun. 30, 2006

(51) Int. Cl.
*G06F 21/00* (2013.01)

(52) U.S. Cl.
USPC ........... 713/176; 707/698; 707/823; 707/828; 707/830; 709/246; 709/232; 709/208; 711/158; 711/216; 711/154; 711/173; 711/202; 711/211; 711/217; 380/28

(58) Field of Classification Search
USPC .......................................................... 713/176
See application file for complete search history.

(56) References Cited

U.S. PATENT DOCUMENTS

| | | | | |
|---|---|---|---|---|
| 5,692,177 A * | 11/1997 | Miller | | 1/1 |
| 5,920,900 A * | 7/1999 | Poole et al. | | 711/216 |
| 6,044,155 A * | 3/2000 | Thomlinson et al. | | 713/155 |
| 6,226,710 B1 * | 5/2001 | Melchior | | 711/108 |
| 6,249,866 B1 * | 6/2001 | Brundrett et al. | | 713/165 |
| 6,360,320 B1 * | 3/2002 | Ishiguro et al. | | 713/164 |
| 6,421,779 B1 * | 7/2002 | Kuroda et al. | | 713/169 |
| 6,438,235 B2 * | 8/2002 | Sims, III | | 380/285 |
| 6,473,846 B1 * | 10/2002 | Melchior | | 711/170 |
| 6,560,599 B1 * | 5/2003 | Boa et al. | | 707/625 |
| 6,683,954 B1 * | 1/2004 | Searle | | 380/30 |
| 6,832,319 B1 * | 12/2004 | Bell et al. | | 713/193 |
| 6,834,346 B1 * | 12/2004 | Ishibashi et al. | | 713/179 |
| 6,912,645 B2 | 6/2005 | Dorward et al. | | 711/216 |
| 6,971,022 B1 * | 11/2005 | Katta et al. | | 713/193 |
| 7,010,693 B1 * | 3/2006 | Lee et al. | | 713/176 |
| 7,136,960 B2 * | 11/2006 | Honig | | 711/108 |
| 7,275,159 B2 * | 9/2007 | Hull et al. | | 713/171 |
| 7,319,759 B1 * | 1/2008 | Peinado et al. | | 380/277 |
| 7,330,981 B2 * | 2/2008 | Willman | | 713/193 |
| 7,352,867 B2 * | 4/2008 | Medvinsky | | 380/278 |
| 7,373,345 B2 * | 5/2008 | Carpentier et al. | | 1/1 |
| 7,647,507 B1 * | 1/2010 | Feng | | 713/193 |
| 7,702,922 B2 * | 4/2010 | Hetzler | | 713/193 |
| 7,921,450 B1 * | 4/2011 | Vainstein et al. | | 726/1 |

(Continued)

OTHER PUBLICATIONS

Mellor, C., 'Making a hash of file content—Content-addressable storage uses hash algorithms', Techworld, Dec. 9, 2003, entire document, http://features.techworld.com/storage/235/making-a-hash-of-file-content/#.*

(Continued)

*Primary Examiner* — Kambiz Zand
*Assistant Examiner* — Ronald Baum
(74) *Attorney, Agent, or Firm* — Campell Stephenson LP

(57) ABSTRACT

Various methods and systems for securing access to hash-based storage systems are disclosed. One method involves receiving information to be stored in a storage system from a storage system client and then generating a key. The key identifies the information to be stored. The value of the key is dependent upon a secret value, which is associated with the storage system. The key is generated, at least in part, by applying a hash algorithm to the information to be stored. The key can then be returned the key to the storage system client. The storage system client can then use the key to retrieve the stored information.

19 Claims, 3 Drawing Sheets

(56) References Cited

U.S. PATENT DOCUMENTS

| | | | |
|---|---|---|---|
| 8,234,505 B2* | 7/2012 | Anderson | 713/193 |
| 2002/0099947 A1* | 7/2002 | Evans | 713/193 |
| 2002/0116616 A1* | 8/2002 | Mi et al. | 713/168 |
| 2002/0188856 A1* | 12/2002 | Worby | 713/193 |
| 2002/0194209 A1* | 12/2002 | Bolosky et al. | 707/205 |
| 2003/0033276 A1* | 2/2003 | Cheng et al. | 707/1 |
| 2003/0123667 A1* | 7/2003 | Weber et al. | 380/277 |
| 2003/0163718 A1* | 8/2003 | Johnson et al. | 713/193 |
| 2003/0212886 A1* | 11/2003 | Sugiura | 713/150 |
| 2004/0030891 A1* | 2/2004 | Kurihara | 713/168 |
| 2004/0039924 A1* | 2/2004 | Baldwin et al. | 713/189 |
| 2004/0151318 A1* | 8/2004 | Duncanson, Jr. | 380/277 |
| 2004/0220975 A1* | 11/2004 | Carpentier et al. | 707/200 |
| 2005/0021948 A1* | 1/2005 | Kamperman | 713/165 |
| 2005/0033959 A1* | 2/2005 | Zheng et al. | 713/169 |
| 2005/0094805 A1* | 5/2005 | Kitani et al. | 380/28 |
| 2005/0125384 A1 | 6/2005 | Gilfix et al. | 707/3 |
| 2005/0257074 A1* | 11/2005 | Alkove et al. | 713/193 |
| 2006/0064756 A1* | 3/2006 | Ebert | 726/26 |
| 2006/0174352 A1* | 8/2006 | Thibadeau | 726/27 |
| 2006/0198515 A1* | 9/2006 | Forehand et al. | 380/28 |
| 2006/0242064 A1* | 10/2006 | Jogand-Coulomb et al. | 705/50 |
| 2006/0242069 A1* | 10/2006 | Peterka et al. | 705/50 |
| 2006/0259790 A1* | 11/2006 | Asokan et al. | 713/194 |
| 2007/0192631 A1* | 8/2007 | Anderson | 713/193 |
| 2007/0208953 A1* | 9/2007 | Durand et al. | 713/193 |
| 2007/0266059 A1* | 11/2007 | Kitamura | 707/204 |

OTHER PUBLICATIONS

Dan Murphy, "Nexsan Assureon appliance solves security, business continuity and compliance issues," Computer Technology Review, available via the Internet at http://www.findarticles.com/p/articles/mi_mOBRZ/is_5_25/ai_n15786518/print, Aug. 2005, pp. 1-2.

Xiaoyun Wang, et al., "Collisions for Hash Functions MD4, MD5, HAVAL-128 and RIPEMD," Aug. 17, 2004, pp. 1-4.

Val Henson, "An Analysis of Compare-by-hash," available via the Internet at http://infohost.nmt.edu/~val/review/hash/index.html, Jun. 16, 2003, 21 pp.

Val Henson, et al., "Guidelines for Using Compare-by-hash," Oct. 2004, pp. 1-14.

MihirBellare, et al., "Message Authentication using Hash Functions—The HMAC Construction," *RSA Laboratories' CryptoBytes*, vol. 2, No. 1, Spring 1996, pp. 1-5.

Sean Quinlan, et al., "Venti a new approach to archival storage," Proceedings of the FAAST 2002 Conference on File and Storage Technologies, Monterey, CA, Jan. 28-30, 2002, pp. 1-14.

Chris Mellor, "Content-addressable storage uses hash algorithms," TechWorld, available via the Internet at http://www.techworld.com/features/index.cfm?featureID=235&printerfriendly=1, Dec. 9, 2003, pp. 1-3.

H. Krawczyk, et al., "HMAC: Keyed-Hashing for Message Authentication," Network Working Group, Feb. 1997, pp. 1-11.

\* cited by examiner

SYSTEM AND METHOD FOR SECURING ACCESS TO HASH-BASED STORAGE SYSTEMS

FIELD OF THE INVENTION

This invention relates to storage systems and, more particularly, to hash-based storage.

DESCRIPTION OF THE RELATED ART

Conventional storage systems access stored data based on a pre-defined location. For example, to store data, information specifying the location (e.g., in terms of a logical block address) is provided to a storage system controller along with the data, which causes the storage controller to store the data at the specified location. To retrieve the stored data, the same location information is provided to the storage system controller, which then returns the data stored at that location. Accordingly, to access data stored in a conventional storage system, the location of that data on the storage media must be specified by the requestor when storing and retrieving the data.

Hash-based storage provides a way to access stored data based on the content or nature of the data. To store data to a hash-based storage system, the data is provided to a hash-based storage system controller which stores the data at a location (chosen by the storage system controller) and returns a key that identifies the data (e.g., such a key can be generated by applying a hash algorithm to the content, name, and/or other information related to the data) to the requestor. To retrieve the stored data from the hash-based storage system, the key is provided to the storage system controller, which then returns the appropriate stored data. One advantage of hash-based storage systems is that such systems have the ability to return the same key for the same set of data, such that if the same set of data is written to the system multiple times, the same key will be returned each time and only one copy of the set of data will actually be stored in the system. Because of this feature, hash-based storage systems are often proposed for use in systems that need to archive large amounts of information, such as medical records.

One weakness of hash-based storage systems is their potential susceptibility to malicious or unauthorized access. For example, hash algorithms are susceptible to collisions, which occur when two different sets of data hash to the same key. A malicious user can exploit this susceptibility in order to corrupt one set of data by generating another data set that hashes to the same key. For example, a malicious user could store a first set of data. If a legitimate user later stores a second set of data that hashes to the same key as the first set of data, the key returned will be the same key used to identify the first set of data and the new set of data will not be stored (instead, the new set of data is handled as if it is duplicate of the first set of data). When the legitimate user attempts to retrieve the second set of data using the key, the first set of data will be returned. In this manner, a malicious user could substitute a corrupt version of a document for the legitimate version of the document within the hash-based storage system.

Another possible weakness of hash-based storage systems is their vulnerability to unauthorized access. For example, if an attacker wants to know if a particular piece of data has been stored in the hash-based storage system and already knows the hash function being used, the attacker can compute the hash of the data and request the data associated with the hash. If the data is present, the hash-based storage system will return the data to the attacker in response to receiving the hash. As an example of a situation in which such an attack might be initiated, an attacker with access to a hash-based storage system at one company might attempt to determine if that company had possession of a particular document (e.g., a medical record, a confidential document belonging to another company, and the like).

As the above examples show, there are situations in which hash-based storage systems are vulnerable to attacks. Accordingly, techniques that reduce a hash-based storage system's susceptibility to such attacks are desirable.

SUMMARY

Various embodiments of methods and systems for securing access to hash-based storage systems are disclosed. In one embodiment, a method involves receiving information to be stored in a storage system from a storage system client and then generating a key. The key identifies the information to be stored. The value of the key is dependent upon a secret value, which is associated with the storage system. The key is generated, at least in part, by applying a hash algorithm to the information to be stored. The key can then be returned the key to the storage system client. The storage system client can then use the key to retrieve the stored information. The secret value used to generate the key can include, for example, a random number that is generated when the storage system is initialized.

In some embodiments, the key is generated by combining the information with the secret value and then applying the hash algorithm the combination of the information and the secret value. The information and the secret value can be combined by, for example, performing a bitwise exclusive-OR of the secret value and a constant to generate a derived value, and then appending the information to the derived value. The hash algorithm can then be applied to the resulting value.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
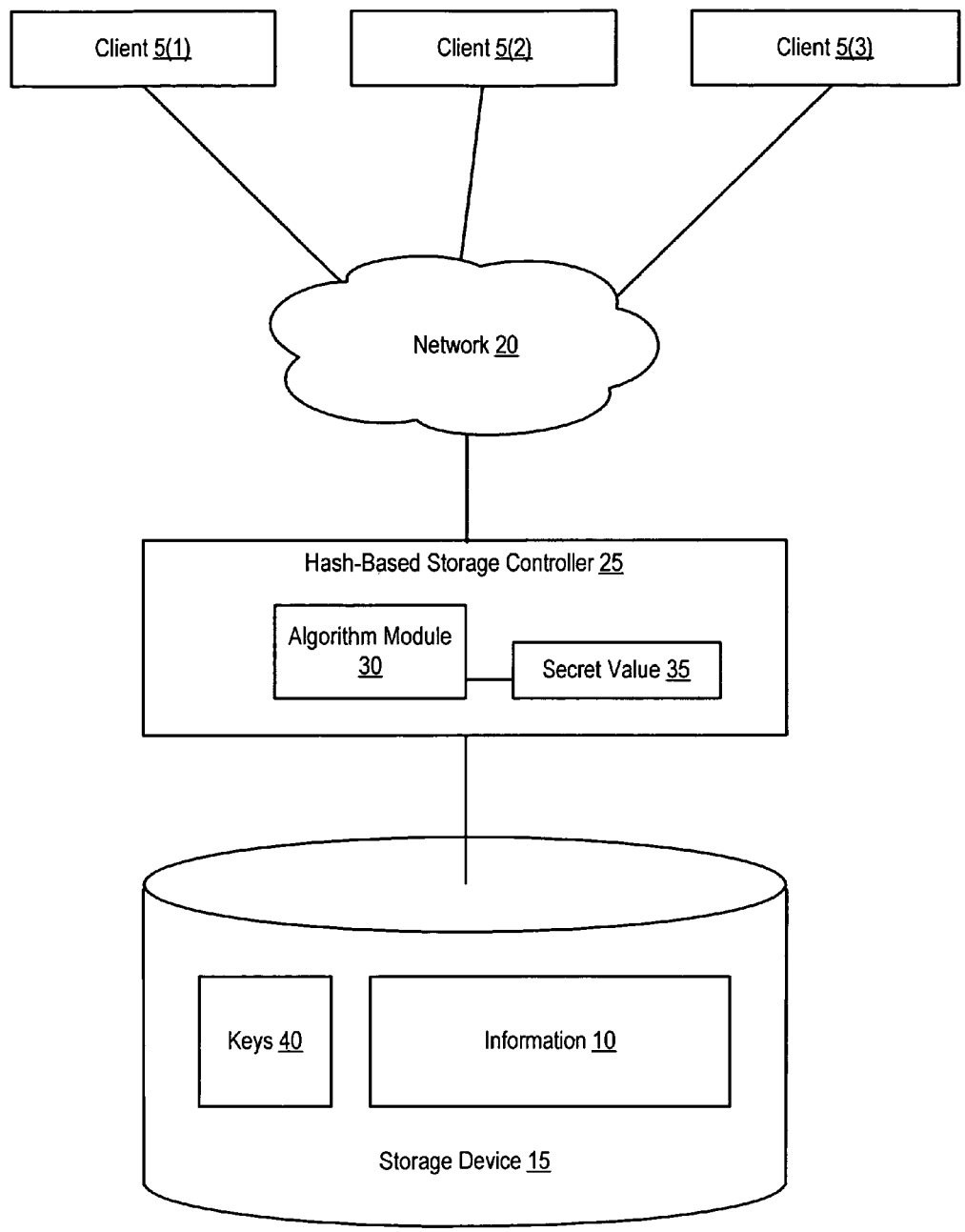
FIG. 1 illustrates a block diagram of a hash-based storage system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a block diagram of a hash-based storage system. As shown, several clients 5(1)-5(3) are coupled to access information 10 stored on storage device 15 via network 20. Network 20 can include a WAN (Wide Area Network), such as the Internet, one or more LANs (Local Area Networks), and/or one or more SANs (Storage Area Networks).

Access to information 10 is controlled by hash-based storage controller 25. Hash-based storage controller includes an algorithm module 30 and a secret value 35. Whenever hash-based storage controller 25 receives information to be stored on storage device 15 from one of clients 5(1)-5(3), hash-based storage controller 25 applies a hash algorithm to the information in order to generate a key. This key is stored (as part of keys 40) and also returned to the client that generated the data. The client can present the key at a subsequent time and, in response, hash-based storage controller 25 will return the stored information. Accordingly, clients 5(1)-5(3) can use keys 40 to address information stored on storage device 15. Hash-based storage controller 25 keeps track of the key and uses that key to locate the information on storage device 15 (e.g., hash-based storage controller 25 can map each key to one or more physical storage locations in which the associated information is stored).

Algorithm module 30 within hash-based storage controller 25 implements a hash algorithm that is applied to information in order to generate a key. In one embodiment, algorithm module 30 implements a version of Secure Hash Algorithm (SHA), such as SHA-1. In other embodiments, other cryptographically secure (e.g., relatively collision resistant and non-invertible) hash algorithms can be implemented. In general, algorithm module 30 implements a hash function that is resistant to collisions (e.g., for a 128-bit key size, a function that requires $2^{127}$ attempts to find a data value that hashes to the same key as another data value is collision-resistant) and non-invertible (e.g., given a particular key, it is relatively difficult to reconstruct the associated data value from which that key was generated). Examples of hash algorithms that can be used by algorithm module 30 include (but are not limited to) Message Digest algorithm 5 (MD5), SHA-1, SHA-224, SHA-256, SHA-384, SHA-512, Research and Development in Advanced Communications Technologies in Europe (RACE) Integrity Primitives Evaluation Message Digest (RIPEMD), RIPEMD-128, RIPEMD-160, RIPEMD-250, and RIPEMD-320.

Secret value 35 is a value that is unique to hash-based storage controller 25. In other words, for a given set of storage controllers, no two storage controllers will have the same secret value. In one embodiment, hash-based storage controller 25 is configured to generate secret value 35 when hash-based storage controller is initially configured for operation. Hash-based storage controller 25 can include a random number generator that generates all or part of secret value 25. All or part of secret value 35 can also be provided (e.g., by an administrator) to hash-based storage controller 25. For example, an administrator can supply all or a portion of the secret value when initially configuring the hash-based storage controller 25 for operation, and the random number generator can supply the remainder of the secret value.

Once secret value 35 has been generated, hash-based storage controller 25 stores secret value 35 in non-volatile storage. Hash-based storage controller 25 is configured to prevent unauthorized access to (or even all access to) secret value 35. As a result, secret value 35 cannot be obtained by storage system clients such as clients 5(1)-5(3).

The value of each key generated by algorithm module 30 is dependent upon secret value 35. For example, algorithm module 30 can combine secret value 35 with each data value before applying the hash algorithm to the data value to obtain a key. In some embodiments, the secret value 35 is combined with the data value in the manner described in Request for Comments (RFC) 2104, which describes how to implement a Hash Message Authentication Code (HMAC), or a similar manner. In other embodiments, algorithm module 30 generates keys that depend upon secret value 35 by modifying how the hash algorithm operates based on the key. For example, based upon secret value 35, algorithm module 30 can modify the initial value (IV) of the hash algorithm, change the order in which certain steps of the hash algorithm are performed, and/or permute the contents of the tables used by the hash algorithm.

Since each key generated by algorithm module 30 is based in part on the secret value 35, a client that does not know secret value 35 cannot generate the key used by hash-based storage controller 25 for a particular piece of information. In other words, the key for a given piece of information cannot be regenerated based only on the data value and the hash algorithm. Accordingly, a malicious client cannot present a key, generated by simply applying a hash algorithm to a piece of information, to hash-based storage controller 25 in an attempt to determine whether the storage system stores that piece of information. Additionally, a malicious client cannot easily select two pieces of information that will have the same key without knowing the secret value.

As noted above, algorithm module 30 can, in some embodiments, combine secret value 35 with the information and apply the hash algorithm to the combined value to generate the key. In one embodiment, the information and secret value 35 are combined by simply appending and/or prepending all or part of secret value 35 to the information (or to each of several sub-units of the information). For example, the first half of secret value 35 can be prepended to the information, and the second half of secret value 35 can be appended to the information. Alternatively, the secret value can be repeated multiple times (e.g., all of secret value 35 can be both prepended and appended, one or more times, to the information. In another embodiment, the information (or sub-units of the information) is combined with secret value 35 using a particular function (such as a bitwise exclusive-OR (XOR) function). In embodiments in which the information to be stored is broken up into sub-units of information, secret value 35 can be combined with each sub-unit of information before the hash algorithm is applied. The sub-units can have a fixed or variable size.

In some embodiments, if secret value 35 is smaller than a prespecified size (e.g., this size can be the same as a fixed size of the sub-units of information mentioned above), a predetermined value (e.g., all ones or all zeros) can be prepended and/or appended to secret value 35 until the "padded" secret value 35 is equal to the prespecified size. This padded secret value is then combined with the information to be stored.

The information and secret value 35 can be combined more than once in some embodiments. Similarly, the hash algorithm can be applied more than once while generating the key. For example, secret value 35 can be appended to the information, a hash algorithm can be applied to the combination, and then secret value 35 can be bitwise XORed with the intermediate result. The hash algorithm can then be reapplied to the result of the bitwise XOR.

In embodiments that use an algorithm such as HMAC to generate keys, secret value 35 is bitwise XORed with an input padding value (e.g., the byte 0x36 repeated a prespecified number of times), the information to be stored is appended to the result of the bitwise XOR, and the hash algorithm is applied to the combined value to generate a hash (the hash algorithm can operate iteratively on successive sub-units of the combined value when generating the hash). Then, the hash is bitwise XORed with an output padding value, such as the byte 0x5C repeated a prespecified number of times, and the resulting value is appended to the original hash. Other potential padding values include 0xa5a5a5 and 0x69696969. Alternatively, the information itself can be repeated as many times as needed to reach the minimum unit size. The hash algorithm is then applied to this combined value to generate the key (again, the hash algorithm can operate iteratively on successive sub units of the combined value). In embodiments such as these, the intermediate results that are produced while generating the key are protected from unauthorized (or even all) access, in a manner similar to the protection of secret value 35.

In some embodiments, algorithm module 30 is configured to generate a key for information received from one of clients 5(1)-5(3) by breaking up the information to be stored into one or more sub-units. In such a situation, an intermediate value can be generated for each sub-unit of information, and the key for the entire set of information can be generated by combining (e.g., using a bitwise XOR) the intermediate values. Alternatively, the key can be generated by concatenating the intermediate values and then applying the hash algorithm to the concatenated value. Other techniques can also be used to combine several intermediate values into a single key. Secret value 35 can be used when generating the intermediate values and/or when combining the intermediate values into a single key. If algorithm module 30 operates on fixed-size units of information, and if the information (or one of the component sub-units) is smaller than the fixed size, a predetermined value (e.g., all zeros or all ones) can be prepended and/or appended to create a unit that has the desired size.

In some embodiments, for a given piece of information, hash-based storage controller 25 can generate two keys. One key is based on the combined information and secret value, as described above. The second key is generated based on just the information (i.e., this second key is not based on the secret value). The second key can be compared to a key provided by the client along with the information (the key provided by the client is generated using the same algorithm used by hash-based storage controller 25). By comparing the second key to the key received from the client, hash-based storage controller 25 can verify that the information is the same information provided by the client. Alternatively, instead of having the client supply the second key, the second key can be generated by the hash-based storage controller and returned to the client (along with the first key, which is based on the secret value), allowing the client to compare the second key to a key the client generated based on the data in order to verify that the same information that was sent to the storage system was actually stored.

The second key, whether generated by the client or the hash-based storage controller, can be stored by the hash-based storage controller along with the data. If the client requests that data be stored and the data is already present in the hash-based storage controller (as determined by comparing first key with the list of keys stored), the second key is also compared to verify that a collision in the first hash function has not occurred.

In order to generate two keys, one that is based on the secret value and another that is not, algorithm module 30 can, in one embodiment, implement two state tables, one state table that is used when generating the first key and another state table that is used when generating the second key. Both state tables are used during a single pass over the data to be hashed. For example, if the data is broken up into sub-units, each time a given sub-unit is processed, algorithm module 30 stores a resulting intermediate value in each state table. In some embodiments (e.g., embodiments in which the secret value is not used when generating intermediate values), the same intermediate value is stored in both state tables, while in other embodiments (e.g., embodiments in which intermediate values depend upon the secret value) different intermediate values are stored in each state table. After all of the sub-units have been processed, the intermediate values stored in the first state table are used to generate the first key and the intermediate values stored in the second state table are used to generate the second key. Thus, the use of two state tables allows both keys to be generated more efficiently, since two passes (one using the secret key and one that does not) over the data are not necessary.

For example, the typical way the hash algorithm operates is by selecting up a portion of the information (e.g., 256 bits) and then applying a set of operations to the selected information (e.g., XOR and shift operations). Once the operations have been performed on that portion of the information, a result (e.g., another 256 bit value) is produced. That value is then combined with the next 256 bits of information to be hashed, and the algorithm repeated. In particular, when HMAC is used, the hash algorithm is first applied to the secret key concatenated with a bunch of 1's or 0's. Then, the hash algorithm is applied to the actual information. Accordingly, when generating two keys, it can be more efficient to apply the algorithm to each portion of the information to be hashed twice (once for each key being generated), instead of cycling through the entire set of information twice.

In some embodiments, hash-based storage controller 25 is configured to use multiple secret values. For example, hash-based storage controller 25 can generate N secret values when hash-based storage controller 25 is initially configured. Each client that accesses information stored on storage device 15 is associated with one of the N secret values, and the associated secret value is used to generate keys returned to that device. Keys generated using different secret values can be associated with the appropriate secret value. When a client provides a key to hash-based storage controller 25, hash-based storage controller 25 will lookup the secret value associated with that client, and then access the set of keys associated with that secret value. If the key provided by that client is in the set of keys associated with the secret value, hash-based storage controller 25 will return the associated information to the client.

In other embodiments, hash-based storage controller 25 can use different secret values 35 over a period of time. For example, if an administrator suspects that secret value 35 has been compromised, the administrator can issue a command that causes hash-based storage controller 25 to replace secret value 35 with a new secret value. Accordingly, keys generated subsequent to the time at which secret value 35 is replaced will be based on the new secret value. In some embodiments, hash-based storage controller 25 can save the old secret value (e.g., in case the keys generated based on that secret value are corrupted and need to be recomputed). Data stored using keys generated by the old secret value will continue to be accessible using those keys.

If two or more different hash-based storage controllers control access to the same storage device (e.g., if the storage system has redundant or parallel controllers), the hash-based storage controllers can be configured to securely exchange secret values with each other. The storage controllers can select one secret value to be used by all of the storage controllers. Alternatively, instead of using the same secret value, the controllers can each use different secret values; however, each time a controller generates a new key, that controller will provide the other controllers with the key as well as information mapping the information associated with that key to physical storage of storage device 15.

Clients 5(1)-5(3) are computing devices (e.g., personal computers, servers, personal digital assistants, telephones, or the like) that implement one or more different applications. The applications can be user applications (e.g., word processing programs, email programs, graphics programs, a database application, or the like) or applications that provide services to such user applications (e.g., a file system, volume manager, or backup application). Clients 5(1)-5(3) access (e.g., read and/or write) information 10 stored on storage device 15.

Hash-based storage controller 25 can be implemented in hardware (e.g., within a storage device controller, such as an array controller, or within a network switch), software, or a combination of both hardware and software. In some embodiments, hash-based storage controller 25 can be integrated within a file system, volume manager, or backup application.

In some embodiments, secret value 35 can be stored on a memory device that is not permanently part of hash-based storage controller 25. For example, secret value 35 can be stored on a memory card, dongle, or other memory device that can be removed from hash-based storage controller 25. Access to the memory device storing secret value 35 can be controlled so that devices other than hash-based storage controller 25 cannot gain access to secret value 35.

Storage device 15 can include one or more storage devices. Storage device 15 can include one or more types of storage media, including optical media (e.g., compact discs and digital versatile discs) and magnetic media (e.g., hard disks or magnetic tape). Storage device 15 can be implemented from an array of individual storage devices (e.g., an optical storage jukebox, a "Just a Bunch of Disks" (JBOD) array, or a Redundant Array of Independent Disks (RAID) system).

Figure 2:
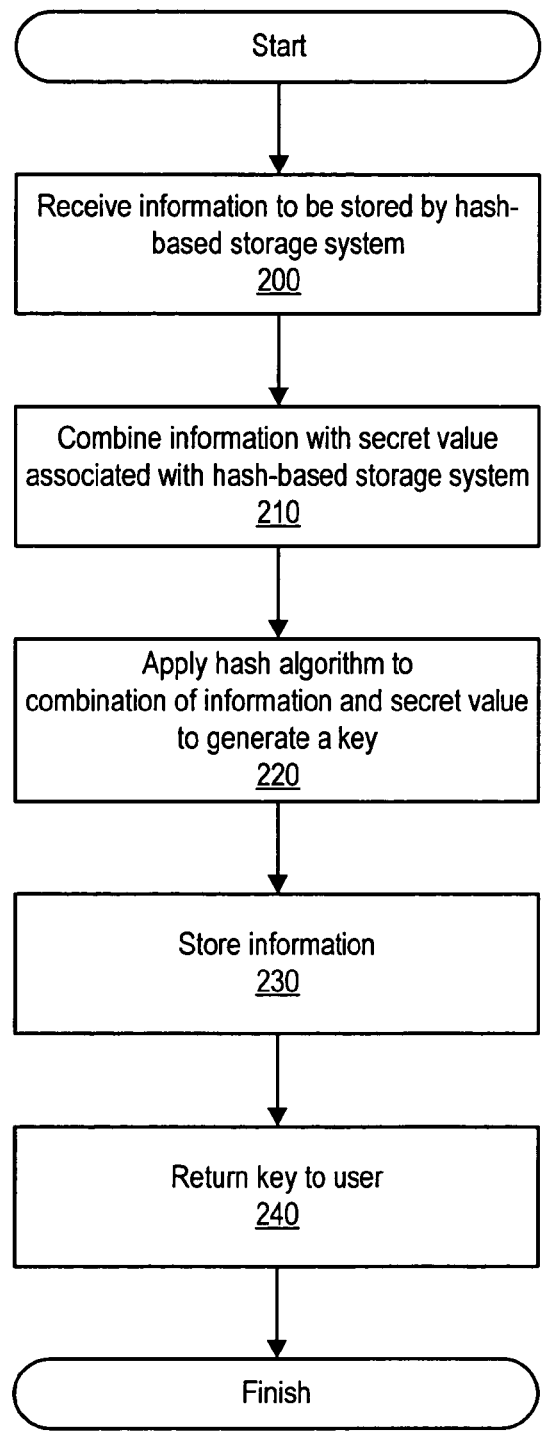
FIG. 2 is a flowchart illustrating an example of a method of processing data for storage in a hash-based storage system.

FIG. 2 is a flowchart illustrating one embodiment of a method of generating a key. This method can be performed by a storage system controller, such as hash-based storage controller 25 of FIG. 1. The method begins at 200, when the storage system controller receives information to be stored by the hash-based storage system from a user (e.g., an application).

At 210, this information is then combined with a secret value that is associated with the hash-based storage system (i.e., the storage system to which access is controlled by the storage system controller). The information can be combined with the secret value in a variety of different manners, including (but not limited to) prepending and/or appending the secret value to the information (or vice versa), prepending and/or appending a value derived from the secret value to the information, prepending and/or appending a value derived from the information to the secret value, and performing an operation (such as a bitwise XOR, OR, AND, or equivalence operation) that takes the information (or a value derived from the information) and the secret value (or a value derived from the secret value) as inputs.

A hash algorithm is then applied to the combination of the information and the secret value to generate a key, as indicated at 220. It is noted that the hash algorithm can be applied several times before the key is generated. For example, after applying the hash algorithm to the combination, the resulting hash can be combined with the secret value and/or information (or values derived from the secret value and/or information), and the hash algorithm can then again be applied to the result of that combination. At 230, the information (received at 200) is stored. The key (generated at 240) is then returned to the user, as indicated at 240.

While FIG. 2 shows how keys that depend upon the secret value can be generated by combining the secret value and the information, other embodiments can generate keys by combining the secret value with the hash algorithm. For example, permutation of the tables or modification of the initialization vectors used by the hash algorithm can be performed, based upon the secret value. Accordingly, keys generated in such a manner will depend upon the secret value.

Figure 3:
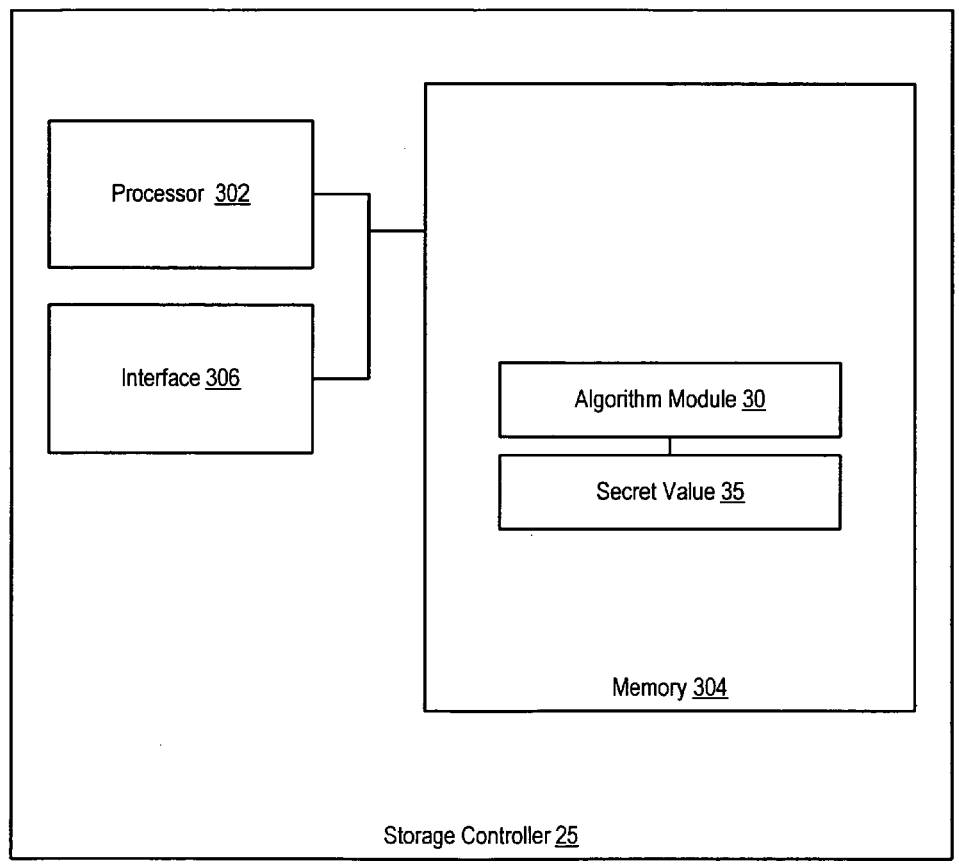
FIG. 3 illustrates how a hash-based storage controller can be implemented in software, according to one embodiment of the present invention.

FIG. 3 illustrates how certain elements of a hash-based storage controller can be implemented in software. FIG. 3 is a block diagram of a storage controller 25 (e.g., hash-based storage controller 25 of FIG. 1). As illustrated, storage controller 25 includes one or more processors 302 (e.g., microprocessors, PLDs (Programmable Logic Devices), or ASICs (Application Specific Integrated Circuits)) configured to execute program instructions stored in memory 304. Memory 304 can include various types of RAM (Random Access Memory), ROM (Read Only Memory), Flash memory, MEMS (Micro Electro-Mechanical Systems) memory, magnetic core memory, and the like. Memory 304 can include both volatile and non-volatile memory. Storage controller 25 also includes one or more interfaces 306. Processor 302, interface 306, and memory 304 are coupled to send and receive data and control signals by a bus or other interconnect.

Interface 306 can include a network interface to various networks (e.g., such as network 20 of FIG. 1) and/or interfaces to various peripheral buses. Interface 306 can also include an interface to one or more storage devices (e.g., storage device 15 of FIG. 1). Interface 306 can, for example, receive a request to access (e.g., read or write) information stored by a storage system controlled by storage controller 25.

In this example, program instructions and data executable to implement all or part of certain storage controller functionality, including algorithm module 30 and secret value 35, are stored in memory 304. It is noted that in alternative embodiments, secret value 35 can be stored separately (e.g., on a separate memory device, which may or may not be included within the storage controller at all times) from algorithm module 30. The program instructions and data implementing algorithm module 30 and secret value 35 can be stored on various computer readable media such as memory 304. In some embodiments, such software is stored on a computer readable medium such as a CD (Compact Disc), DVD (Digital Versatile Disc), hard disk, optical disk, tape device, floppy disk, and the like). In order to be executed by processor 302, the instructions and data implementing algorithm module 30 and/or secret value 35 can be loaded into memory 304 from the other computer readable medium. The instructions and/or data implementing algorithm module 30 and secret value 35 can also be transferred to storage controller 25 for storage in memory 304 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving information to be stored in a storage system, wherein
the information is received from a storage system client by a storage controller;
generating a combined value of the information and a secret value, wherein
the secret value is combined with each item of a plurality of items of information stored by the storage system,
the generating the combined value is performed according to a specified algorithm, and
the specified algorithm combines the information with the secret value, wherein
combining the information with the secret value modifies the information such that the combined value is produced and the combined value hashes to a different value than the information;
generating a key, wherein
the key identifies the information,
the key facilitates retrieval of the information by the storage system client,
the key is algorithmically dependent upon the secret value and the information,
the generating the key comprises the storage controller applying a hash algorithm to the combined value of the information and the secret value,
the secret value is unknown by the storage system client, and
the secret value is associated with the storage system;
generating mapping information to map the key to a corresponding location in the storage system;
storing the key and the information identified by the key in the storage system, wherein the information identified by the key is stored in the corresponding location, as indicated by the mapping information;
returning the key to the storage system client in response to the generating the key,
wherein
the returning the key to the storage system client enables the storage system client to use the key to retrieve the information from the storage system, by virtue of the key being mapped to the corresponding location; and
subsequent to the returning the key, receiving a request from the storage system client to access the information, wherein
the request to access the information comprises the key.

2. The method of claim 1, further comprising:
generating a random number upon initializing the storage system, wherein the secret value comprises the random number.

3. The method of claim 1, further comprising:
returning the information to the storage system client, in response to receipt of the key.

4. The method of claim 1, further comprising:
generating a second key, wherein
the generating the second key comprising applying the hash algorithm to the information,
the generating the second key excludes the secret value, and
the second key is generated concurrently with the key, and
a value of the second key is not based on the secret value.

5. The method of claim 4, further comprising:
comparing one of the key and the second key to a list of keys; and
in response to the one of the key and the second key matching any key in the list of keys, comparing the other one of the key and the second key with the list of keys to identify whether a hash collision has occurred.

6. The method of claim 1, wherein the combining is performed using HMAC.

7. The method of claim 1, wherein the hash algorithm is one of a plurality of types of Secure Hash Algorithm (SHA) or one of a plurality of types of Research and Development in Advanced Communications Technologies in Europe (RACE) Integrity Primitives Evaluation Message Digest (RIPEMD) algorithms.

8. The method of claim 1, further comprising:
modifying how the hash algorithm is applied to the information, based upon the secret value.

9. The method of claim 1, further comprising:
detecting at least one of that the secret value has been compromised or the secret value has expired;
generating a second secret value associated with the storage system; and
replacing the secret value with the second secret value.

10. The method of claim 1, wherein
the secret value is unique to the storage controller,
the secret value is generated, at least in part, by the storage controller, and
the secret value is unavailable to the storage system client.

11. The method of claim 1, wherein
a plurality of secret values are associated with the storage system, and
each secret value of the plurality of secret values is associated with a respective storage system client of a plurality of storage system clients.

12. The method of claim 1, further comprising:
dividing the information into a plurality of sub-units;
generating a respective intermediate value for each of the sub-units; and
combining the intermediate values, wherein
combining the intermediate values is performed according to a pre-specified algorithm.

13. A non-transitory computer readable storage medium comprising program instructions executable to:
receive information to be stored in a storage system, wherein
the information is received from a storage system client;
generate a combined value of the information and a secret value, wherein
the secret value is combined with each item of a plurality of items of information stored by the storage system,
generating the combined value is performed according to a specified algorithm, and
the specified algorithm combines the information with the secret value, wherein
combining the information with the secret value modifies the information such that the combined value is produced and the combined value hashes to a different value than the information;
generate a key, wherein
the key identifies the information,
the key facilitates retrieval of the information by the storage system client,
the key is algorithmically dependent upon the secret value and the information,
the generating the key comprises applying a hash algorithm to the combined value of the information and the secret value, the secret value is unknown by the storage system client, and the secret value is associated with the storage system;

generate mapping information to map the key to a corresponding location in the storage system;

store the key and the information identified by the key in the storage system, wherein the information identified by the key is stored in the corresponding location, as indicated by the mapping information;

return the key to the storage system client in response to the generating the key, wherein returning the key to the storage system client enables the storage system client to use the key to retrieve the information from the storage system, by virtue of the key being mapped to the corresponding location; and subsequent to the returning the key, receive a request from the storage system client to access the information, wherein the request to access the information comprises the key.

14. The non-transitory computer readable storage medium of claim 13, wherein the program instructions are further executable to:

return the information to the storage system client, in response to receipt of the key.

15. The non-transitory computer readable storage medium of claim 13, wherein the program instructions are further executable to:

modify how the hash algorithm is applied to the information, based upon the secret value.

16. A storage system controller comprising:

an interface configured to receive a request to store information in a storage system from a storage system client, generate mapping information to map a key to a corresponding location in the storage system, store the key and the information identified by the key in the storage system, wherein the information identified by the key is stored in the corresponding location, as indicated by the mapping information;

return the key to the storage system client, wherein returning the key to the storage system client enables the storage system client to use the key to retrieve the information from the storage system, by virtue of the key being mapped to the corresponding location, and subsequent to the returning the key, receive a request from the storage system client to access the information, wherein the request to access the information comprises the key; and an algorithm module coupled to the interface and configured to generate a combined value of the information and a secret value, wherein the secret value is combined with each item of a plurality of items of information stored by the storage system, generating the combined value is performed according to a specified algorithm, and the specified algorithm combines the information with the secret value, wherein combining the information with the secret value modifies the information such that the combined value is produced and the combined value hashes to a different value than the information; and generate the key, wherein the key identifies the information, the key facilitates retrieval of the information by the storage system client, the key is algorithmically dependent upon the secret value associated with the storage system controller and the information, generating the key comprises the storage controller applying a hash algorithm to the combined value of the information and the secret value, the secret value is unknown by the storage system client, and the algorithm module is configured to apply a hash algorithm to the combined value of the information and the secret value in order to generate the key.

17. The storage system controller of claim 16, wherein the storage system controller is configured to return the information to the storage system client, in response to receipt of the key from the storage system client.

18. The storage system controller of claim 16, wherein the algorithm module is configured to modify how the hash algorithm is applied to the information, based upon the secret value.

19. A system comprising:

a storage system, wherein the storage system is configured to store information and a key identifying the information;

means for generating mapping information to map the key to a corresponding location in the storage system;

means for storing the key and the information identified by the key in the storage system, wherein the information identified by the key is stored in the corresponding location, as indicated by the mapping information;

means for receiving the information to be stored in the storage system and returning the key to a storage system client, wherein the information is received from the storage system client, and returning the key to the storage system client enables the storage system client to use the key to retrieve the information from the storage system, by virtue of the key being mapped to the corresponding location;

means for receiving, subsequent to the returning the key, a request from the storage system client to access the information, wherein the request to access the information comprises the key;

means for generating a combined value of the information and a secret value, wherein the secret value is combined with each item of a plurality of items of information stored by the storage system, generating the combined value is performed according to a specified algorithm, and the specified algorithm combines the information with the secret value, wherein combining the information with the secret value modifies the information such that the combined value is produced and the combined value hashes to a different value than the information; and means for generating the key, wherein the key identifies the information, the key facilitates retrieval of the information by the storage system client, the key is algorithmically dependent upon the secret value and the information, generating the key comprises applying a hash algorithm to the combined value of the information and the secret value, the secret value is unknown by the storage system client, and the secret value is associated with the storage system.

* * * * *